United States Patent
Hill et al.

(10) Patent No.: US 8,026,950 B2
(45) Date of Patent: Sep. 27, 2011

(54) METHOD OF AND APPARATUS FOR SELECTING A STEREOSCOPIC PAIR OF IMAGES

(75) Inventors: Lyndon Hill, Berkshire (GB); Graham R. Jones, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 1247 days.

(21) Appl. No.: 10/570,427

(22) PCT Filed: Sep. 3, 2004

(86) PCT No.: PCT/IB2004/051679
§ 371 (c)(1),
(2), (4) Date: Oct. 23, 2006

(87) PCT Pub. No.: WO2005/025239
PCT Pub. Date: Mar. 17, 2005

(65) Prior Publication Data
US 2007/0165129 A1    Jul. 19, 2007

(30) Foreign Application Priority Data
Sep. 4, 2003 (GB) .................................. 0320672.9

(51) Int. Cl.
*H04N 5/225* (2006.01)
(52) U.S. Cl. ......... 348/218.1; 348/42; 348/50; 382/294; 352/62
(58) Field of Classification Search .......... 348/335, 348/50, 42, 51, 36, 218.1; 359/462–473; 351/212; 382/154, 294; 352/62; 356/611
See application file for complete search history.

(56) References Cited

U.S. PATENT DOCUMENTS

| | | | | |
|---|---|---|---|---|
| 3,943,344 A | * | 3/1976 | Kidode et al. | 702/166 |
| 4,791,478 A | * | 12/1988 | Tredwell et al. | 348/42 |
| 5,054,097 A | * | 10/1991 | Flinois et al. | 382/294 |
| 5,455,689 A | * | 10/1995 | Taylor et al. | 358/450 |
| 5,682,197 A | * | 10/1997 | Moghadam et al. | 348/36 |
| 6,225,979 B1 | * | 5/2001 | Taima et al. | 345/157 |
| 6,583,814 B1 | * | 6/2003 | Runtze et al. | 348/189 |
| 6,618,497 B1 | * | 9/2003 | Nakayama | 382/154 |
| 6,677,981 B1 | * | 1/2004 | Mancuso et al. | 348/36 |

(Continued)

FOREIGN PATENT DOCUMENTS
GB    2 370 443 A    6/2002
(Continued)

OTHER PUBLICATIONS
International Search Report for corresponding Application No. PCT/JP2004/051679 mailed Dec. 13, 2004.
(Continued)

*Primary Examiner* — Tuan Ho
*Assistant Examiner* — Kent Wang
(74) *Attorney, Agent, or Firm* — Renner, Otto, Boisselle & Sklar, LLP

(57) ABSTRACT

A method is provided for selecting a stereoscopic pair of images, for example as they are captured by a camera or from an existing collection of captured images. A first image is selected and a cursor overlaid on the first image is aligned with an image feature. The cursor is then shifted by a predetermined amount and a second image is selected such that the cursor is overlaid on the second image and is substantially aligned with the feature.

31 Claims, 6 Drawing Sheets

U.S. PATENT DOCUMENTS

| | | | | |
|---|---|---|---|---|
| 6,697,573 B1* | 2/2004 | Adkins | | 396/324 |
| 6,747,610 B1* | 6/2004 | Taima et al. | | 345/6 |
| 6,791,598 B1* | 9/2004 | Luken et al. | | 348/36 |
| 6,980,690 B1* | 12/2005 | Taylor et al. | | 382/154 |
| 7,091,931 B2* | 8/2006 | Yoon | | 345/9 |
| 7,123,292 B1* | 10/2006 | Seeger et al. | | 348/218.1 |
| 7,215,809 B2* | 5/2007 | Sato et al. | | 382/154 |
| 7,466,336 B2* | 12/2008 | Regan et al. | | 348/50 |
| 2001/0045979 A1 | 11/2001 | Matsumoto et al. | | |
| 2002/0001036 A1 | 1/2002 | Kinjo | | |
| 2002/0105514 A1* | 8/2002 | Roche, Jr. | | 345/419 |
| 2002/0118454 A1* | 8/2002 | Hey | | 359/466 |
| 2002/0135539 A1* | 9/2002 | Blundell | | 345/6 |
| 2002/0191841 A1* | 12/2002 | Harman | | 382/154 |
| 2003/0136907 A1* | 7/2003 | Takane et al. | | 250/310 |
| 2003/0151659 A1* | 8/2003 | Kawano et al. | | 348/42 |
| 2003/0152263 A1 | 8/2003 | Kawano et al. | | |
| 2004/0027451 A1* | 2/2004 | Baker | | 348/46 |
| 2004/0041906 A1* | 3/2004 | Fruit | | 348/50 |

FOREIGN PATENT DOCUMENTS

| | | |
|---|---|---|
| JP | 2000-305207 | 11/2000 |
| JP | 2001-230955 | 8/2001 |
| JP | 2003-2445000 | 8/2003 |

OTHER PUBLICATIONS

Japanese Office Action for corresponding application No. JP2006-525981 dated Sep. 10, 2009.

* cited by examiner

FIG. 3
A plain image
Image with a box cursor
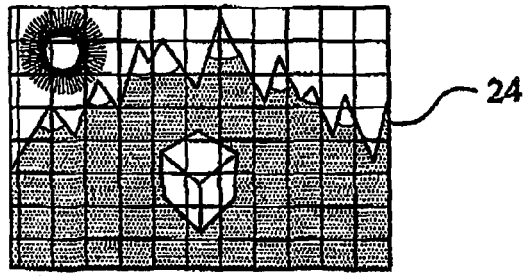
Image with a grid cursor
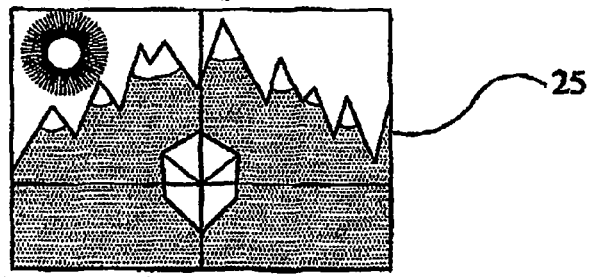
Image with cross hair cursor
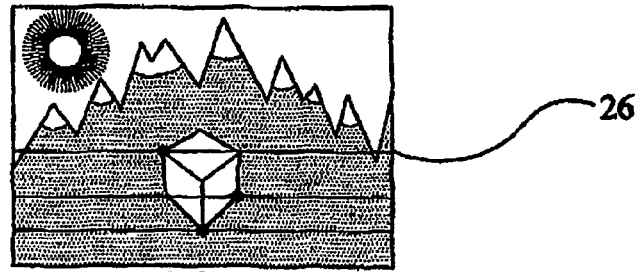
Image with feature points highlighted and lines

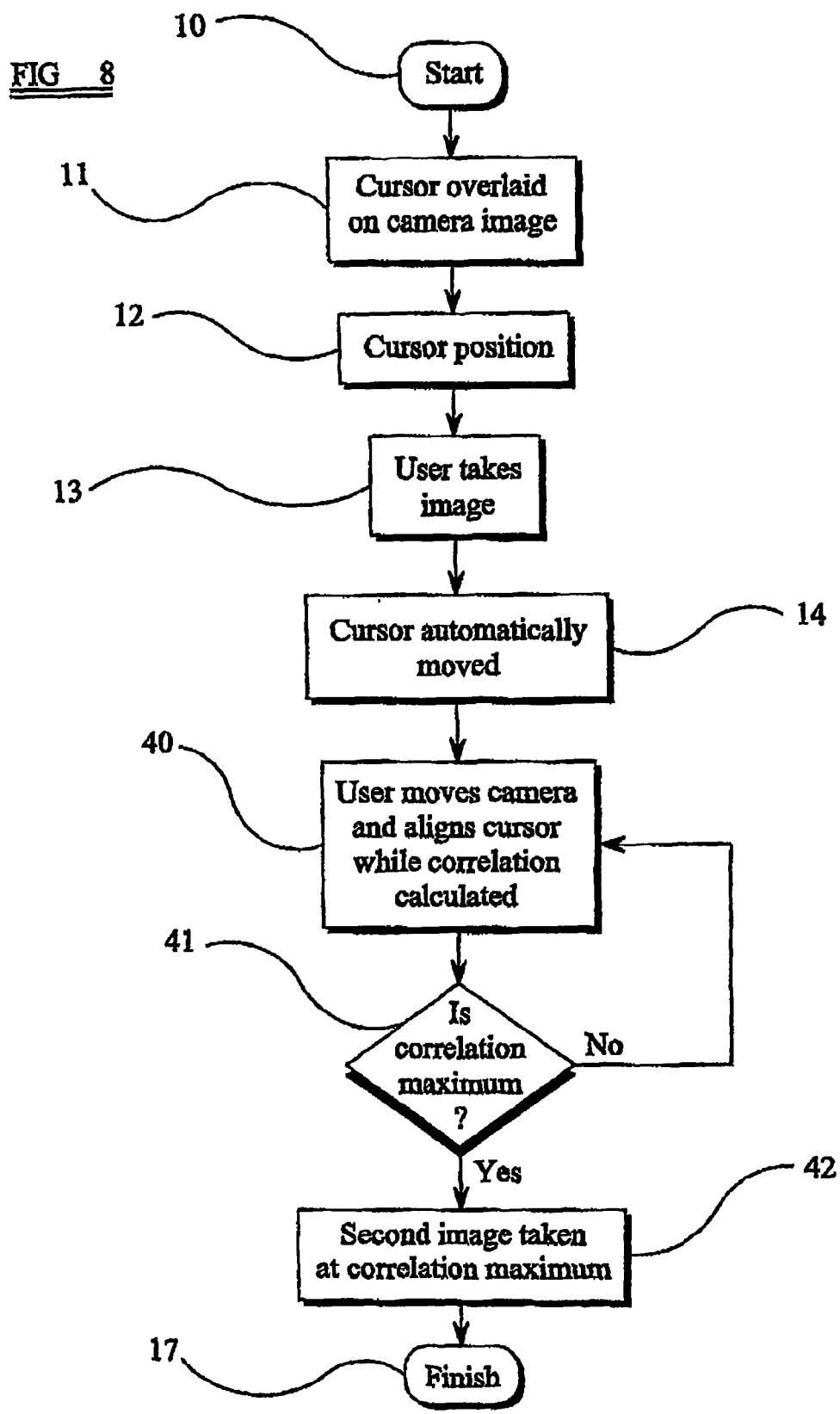

METHOD OF AND APPARATUS FOR SELECTING A STEREOSCOPIC PAIR OF IMAGES

TECHNICAL FIELD

The present invention relates to a method of and an apparatus for selecting a stereoscopic pair of images. The present invention also relates to computer programs for such methods. Such techniques may be used, for example, in photography, videography, movie production and any application where stereoscopic images may be required. Such techniques may be used at the time of capturing stereoscopic images or may be used following capture, for example, to select stereoscopic pairs from still images or video sequences.

BACKGROUND ART

Three dimensional images as used in most 3D display technologies, e.g. EP 0 602 934, EP 0 656 555, EP 0 708 351, EP 0 726 482, EP 0 829 743 and EP 0 860 728 are formed by two 2D images. These displays direct separate images to either eye so that one eye sees one image and the other eye sees the other image. The Human Visual System (HVS) internally fuses the two images into a 3D image so that a person may sense depth from the displayed images.

In order to make stereoscopic images which may be viewed comfortably, the two images must be well aligned. This can be accomplished either by very accurate placement of the camera before capturing the images or by a post processing stage such as image rectification, for example as disclosed in EP 1 235 439. Image rectification is a method for re-aligning the two images so that they are parallel in three dimensions. This involves reprojecting them onto a common parallel plane by a geometrical transformation. When the images are parallel in this manner, they are considered to be rectilinear. If the images are not rectilinear, then the stereo image will be uncomfortable to view due to vertical disparities, perspective effects, excessive depth, etc, that the HVS cannot reconcile and the 3D effect breaks down.

Image rectification methods usually use powerful computer vision algorithms. However if the initial pair of images are badly aligned, such algorithms will be very slow or may completely fail. If a large amount of rectification is required, then the image quality may suffer when the two images are reprojected. Furthermore, the image overlap between the rectified images may be reduced and less usable image area will be available for the 3D image. Conversely, if the initial image alignment is good, the rectification can be processed much faster and undesirable side effects from image reprojection will be reduced. Therefore, if the two initial images are taken from well aligned positions, then a more comfortable 3D image may be created and a minimal amount of rectification will be required.

2001-230955 discloses a technique which is used in the Pentax Optio 230 digital camera and which provides a user-guided two shot stereo photography mode. In this method, the user takes the first image and is advised to "move the camera to the right". A transparent vertical or horizontal strip of the first image is superimposed on the live image. The user is meant to align the second image to the first image using this strip. However, when this technique is followed, the camera will be rotated relative to its orientation when the first image was taken so that perspective errors are introduced and the two images are not rectilinear, resulting in a 3D image of poor visual quality.

EP1085769 discloses a variable separation dual-head camera that may utilise a method of image rectification such as that disclosed in EP1089573 for determining the amount of separation. This system is based on a priori knowledge of the scene. There is currently no known automated system for providing a recommendation of the separation required for producing 3D images which may be comfortably viewed.

The term "image feature" as used hereinafter is defined to mean anything which appears in an image. This includes, for example, lines, patterns and shading. This term is being used with its conventional meaning in the technical field of vision research.

DISCLOSURE OF THE INVENTION

According to a first aspect of the invention, there is provided a method of selecting a stereoscopic pair of images, comprising the steps of:

(a) selecting a first image;

(b) aligning at least one cursor overlaid on the first image with at least one image feature of the first image;

(c) shifting the or each cursor laterally by a predetermined amount; and (d) selecting a second image which contains the feature and in which the or each cursor is overlaid on the second image and is substantially aligned with the or each feature.

The predetermined amount may correspond substantially to an average inter-ocular separation.

The predetermined amount may correspond to at least one parameter of a display for displaying the first and second images.

The predetermined amount may be dependent on image feature depth in the first image.

The predetermined amount may correspond to a maximum comfortable viewing depth.

The step (b) may comprise aligning the or each cursor manually.

The steps (a) and (d) may comprise selecting the first and second images from a set of precaptured images.

The step (a) may comprise capturing the first image by means of a camera and, the step (d) may comprise capturing the second image by means of the camera when the or each cursor is substantially aligned with the or each feature. The second image may be captured manually. The step (a) may be performed between the steps (b) and (c). The camera may have an optical axis and may be oriented such that the optical axis when the second image is captured is substantially parallel to the optical axis when the first image is captured. The positions of the camera from which the first and second images are captured may be spaced from each other substantially laterally and substantially perpendicularly to the optical axis when the first image was captured.

The or each cursor may comprise at least one of a grid of orthogonal lines, a cross-hair, a plurality of dots, a symbol defining a region of non-zero area, and a portion of the first image. The symbol may be a substantially rectangular outline. The cursor may be displayed alongside a laterally shifted cursor in both the first and second images.

The step (d) may comprise overlaying part of the first image on the second image. The part of the first image may be modified before overlaying, for example by being spatially highpass filtered. The part of the first image may comprise the portion of the first image overlaid by the region.

The step (d) may comprise performing a correlation between the first image and at least one candidate second image. The step (d) may comprise the user selecting the second image based on an indication of the level of correlation. The step (d) may comprise selecting the second image when the correlation exceeds a threshold. The step (d) may comprise selecting the second image when the correlation is a maximum.

The at least one cursor may comprise the symbol and the correlation may be performed between a part of the first image overlaid by the symbol and a part of the at least one candidate second image overlaid by the shifted symbol. The areas over which correlation is performed of the first image and the at least one candidate second image may overlap each other.

The correlation may be performed on at least one of luminance, feature points, texture and colour.

The correlation may comprise at least one of mathematical cross-correlation, mean square error, maximum absolute difference and phase correlation. The step (d) may comprise providing an indication of distance to a position of the camera for capturing the second image.

According to a second aspect of the invention, there is provided an apparatus for performing a method according to the first aspect of the invention.

According to a third aspect of the invention, there is provided an apparatus for selecting a stereoscopic pair of images, comprising:

a display for displaying images;

means for causing the display to display at least one cursor overlying a displayed image;

means for aligning the at least one cursor with a respective image feature of the displayed image;

means for selecting a displayed image; and means for shifting the at least one cursor laterally by a predetermined amount in response to selection by the selecting means of a first image.

The apparatus may comprise a camera. The display may comprise a camera viewfinder display. The selecting means may comprise a manually operable control for controlling the camera to capture at least the first image.

According to further aspects of the invention, there are provided a computer program for causing an apparatus according to the second or third aspect of the invention and comprising a computer to perform a method according to the first aspect of the invention, a computer program for adapting an apparatus, which comprises a computer and which is not capable of performing a method according to the first aspect of the invention, to perform a method according to the first aspect of the invention, and a carrier medium carrying such a program.

It is thus possible to provide techniques which allow a user to select stereoscopic pairs of images relatively easily and quickly. In the case of capturing images using a camera, this technique guides a user into capturing pairs of images which are substantially rectilinear and which require little or no processing before being displayed by means of a 3D display. It is not necessary for a user to attempt to match two images which are suffering from perspective distortion because of rotation of the camera between capturing the first and second images.

For example, these techniques may be used to guide a person so that they can take two 2D images from good positions so that they are close to being rectilinear. These techniques may be used for guiding a person when taking the second image from a single camera, for selecting the best image as the second image from a sequence of stills or video sequence, or for guiding the adjustment of a dual head camera or two camera system where the separation may be varied.

Structure in the scene is used by the user so that, when the first image is taken, the structure is used as a reference by overlaying a cursor on some image feature. This cursor is translationally shifted and the camera is moved in a parallel manner so that the feature is again under the cursor. The second image is then taken from a parallel position at a regulated camera separation and hence provides controlled depth. A correlation metric may be calculated between the two camera positions and the camera can take the second image automatically when the correlation is at a maximum and the camera is in the correct position.

Position measuring sensors such as GPS (Global Positioning System), compass and tilt sensors may also be used to enhance the system and provide additional feedback to help ensure the two images are as parallel as possible.

BRIEF DESCRIPTION OF THE DRAWINGS

The present invention will be further described, by way of example, with reference to the accompanying drawings, in which:

FIG. 3 illustrates the appearances of different types of cursors overlaid on the same image;

FIG. 8 is a flow diagram illustrating a second method constituting an embodiment of the invention.

Like reference numerals refer to like parts throughout the drawings.

BEST MODE FOR CARRYING OUT THE INVENTION

Figure 1:
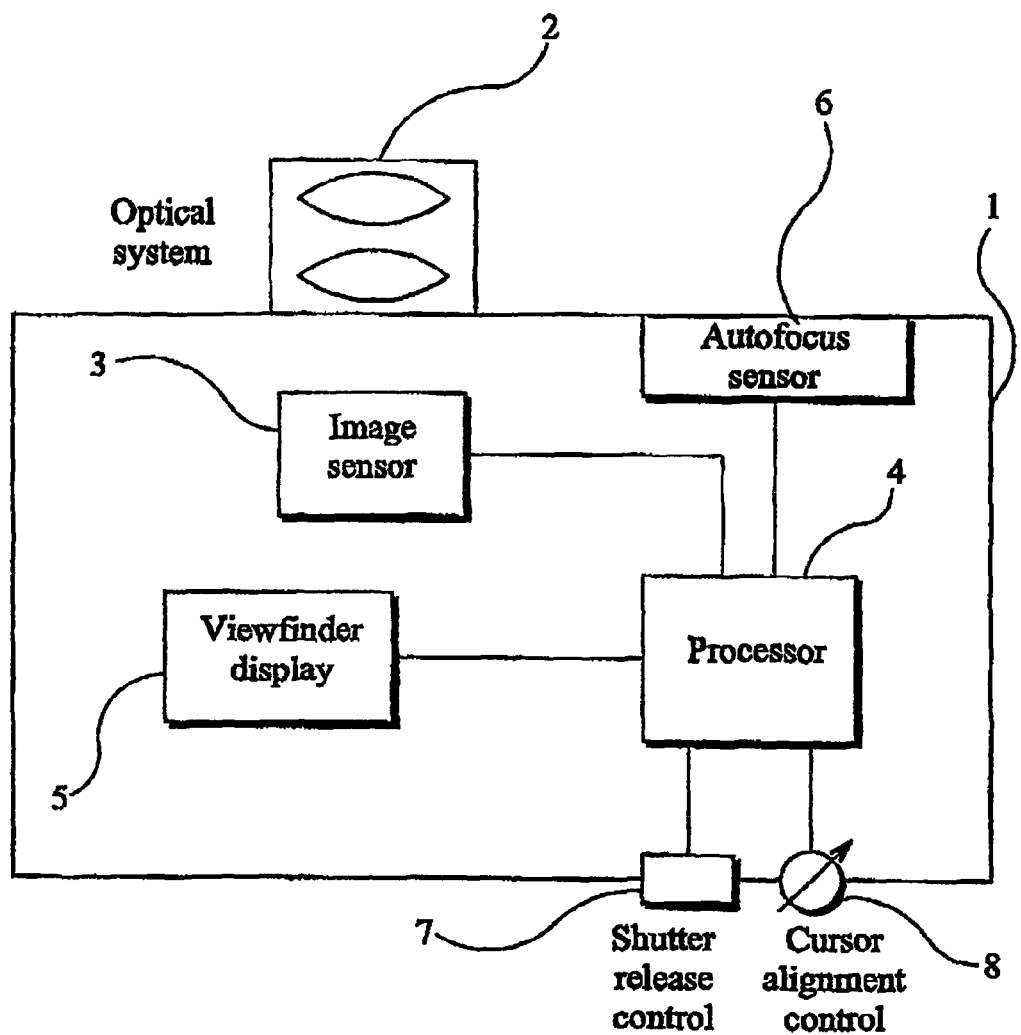
FIG. 1 is a block schematic diagram of a digital still camera constituting an embodiment of the invention.

FIG. 1 illustrates an apparatus constituting an embodiment of the invention in the form of a digital "still" camera 1. The camera 1 comprises an optical system 2 of conventional type for forming an image of a scene. The camera 1 also comprises a conventional image sensor 3 on which the image is formed and which converts the optical image into corresponding electrical signals. The output of the image sensor 3 is connected to a processor 4, which processes the sensor signal in any suitable way, for example for display and subsequent printing to a hard copy. The processor 4 has an output connected to a viewfinder display 5, for example of the colour liquid crystal display (LCD) type.

The optical system 2 comprises a set of lenses and a motor or the like for adjusting the positions of the lenses or lens groups to perform focusing. The camera 1 is of the "autofocus" type and includes an autofocus sensor 6, which supplies to the processor 4 information about the distance from the camera to objects in the scene. The processor 4 controls the autofocus mechanism of the optical system 2 in accordance with information from the sensor 6.

The parts of the camera 1 described so far are essentially conventional. However, the processor 4 is arranged to perform a method of selecting stereoscopic pairs of images as described hereinafter. A conventional shutter release control 7 is provided and is actuated by a user who wishes to capture the image which is currently imaged on the sensor 3 by the optical system 2. The processor 4 is also connected to a "cursor alignment" control 8 which is used to permit manual alignment of a cursor as described hereinafter.

Figure 2:
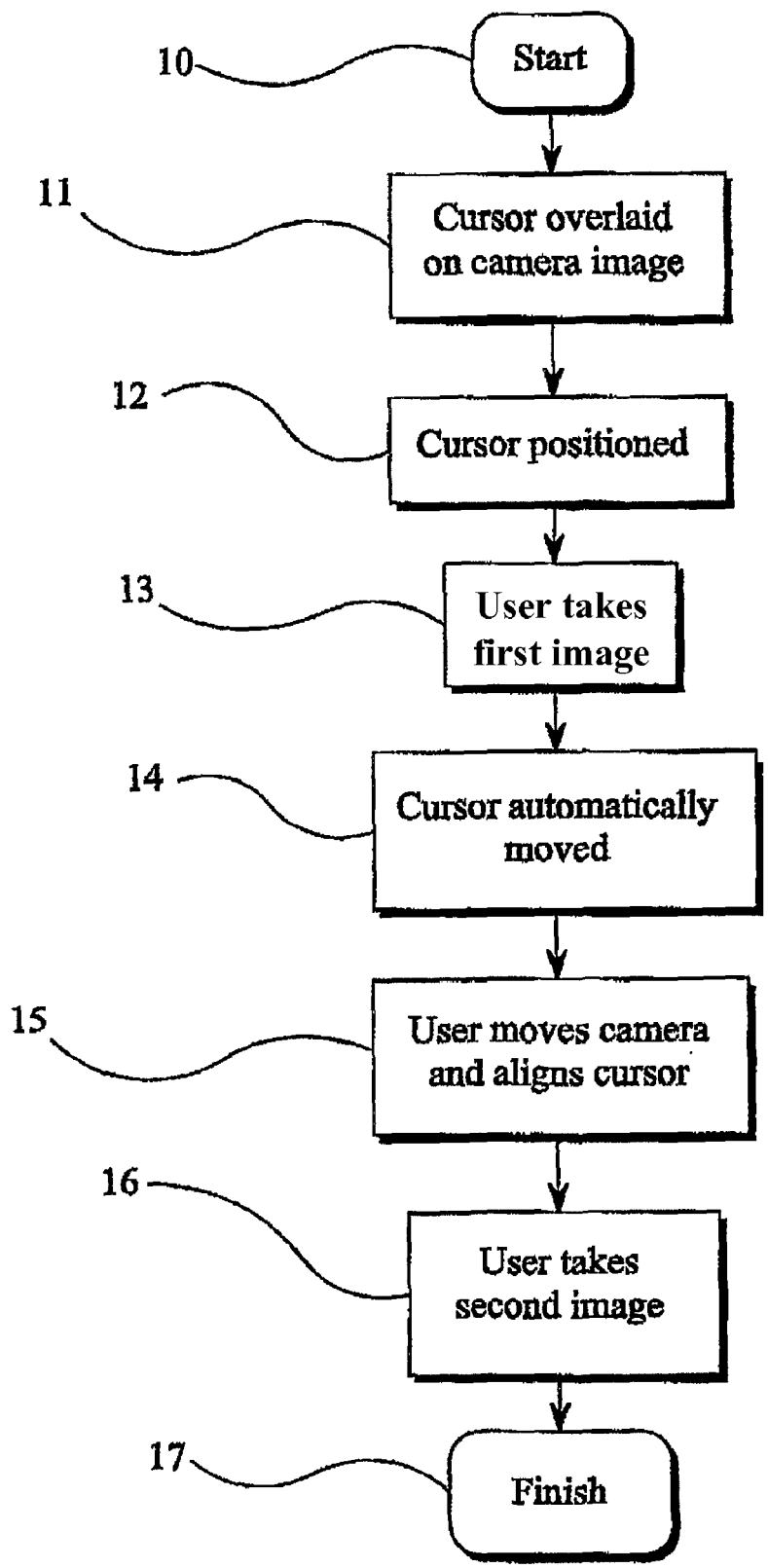
FIG. 2 is a flow diagram illustrating a first method of selecting stereoscopic pairs of images constituting an embodiment of the invention.

In order to select a stereoscopic pair of images, the method illustrated in the flow diagram of FIG. 2 and constituting an embodiment of the invention may be performed. When selecting the first image, the user views the viewfinder display 5, which displays the image currently imaged on the sensor 3 by the optical system 2. The processor 4 causes the display 5 to display one or more cursors, the or each of which is overlaid on the viewfinder image. The user can adjust the control 8 so as to move the cursor in order to align it with or "highlight" a particular image feature of the image displayed by the display 5. For example, the cursor may be used to highlight a person or an object in the foreground of the scene currently being imaged onto the sensor 3. This is illustrated in FIG. 2, following the start 10 of the method, by steps 11 and 12.

Alternatively or additionally, the cursor may be aligned automatically with an image feature. For example, the processor 4 may process the signal from the sensor 3 to identify a suitable image feature and may then automatically align the cursor or one of the cursors with that feature on the display 5. In the case where cursors are aligned automatically, the dedicated cursor alignment control 8 may be omitted. Alternatively, cursor alignment may be performed by conventional and existing camera controls which are arranged to permit manual cursor alignment during stereoscopic image capture.

FIG. 3 illustrates several examples of cursor appearances which may be used in this method. A "plain" image exemplifying an image which may be displayed by the viewfinder display 5 is illustrated at 20. A feature which is to be highlighted by the cursor by aligning the cursor with it is illustrated at 21 and comprises a foreground feature illustrated as a cube by way of example.

FIG. 3 illustrates at 22 an example of a closed two dimensional geometric shape 23 in the form of a square or rectangular outline. This particular shape is only one example of closed shapes which may be used as the cursor and, although being illustrated as formed by unbroken lines, may also be displayed by broken lines. In general, any closed two dimensional shape of non-zero area may be used. Only the outline of the shape may be displayed as the cursor. Alternatively, the interior of the shape may also be displayed but, in general, should appear partially transparent for ease of aligning the cursor 23 with the image feature 21.

FIG. 3 illustrates at 24 another type of cursor in the form of a grid of orthogonal lines. FIG. 3 illustrates at 25 a cursor in the form of a cross-hair, which is used to highlight a specific point of the feature 21 by aligning the cross-hair crossing point with that feature (in this case, an apex of the cube 21). FIG. 3 illustrates at 26 a plurality of feature points, in this case three, which are aligned with specific features of the foreground object 21. Horizontal lines passing through these feature points are also illustrated and may be useful in assisting to reduce rotation of the camera when moving from one image-capturing position to another.

Although the camera is described as being of the digital still type, this method may be used with other types of camera. For example, this method may be used with film cameras having conventional optical viewfinder displays and with additional optical elements for making the cursor visible in the viewfinder display.

Figure 4:
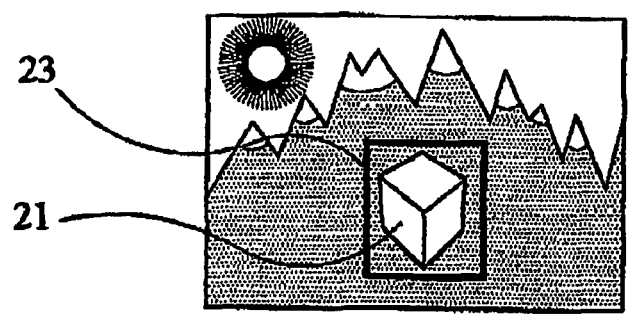
FIG. 4 illustrates the appearance of a viewfinder display when a first image is selected.
Figure 5:
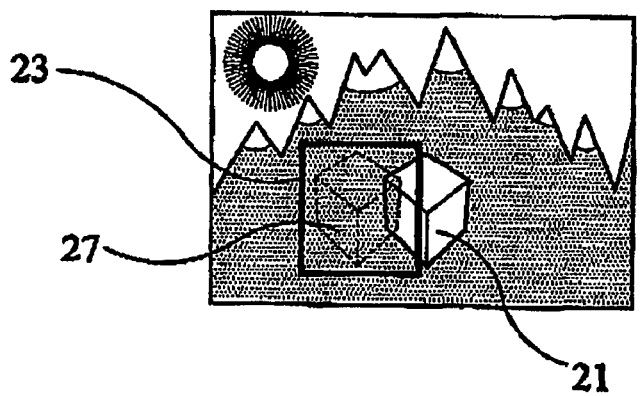
FIG. 5 illustrates the appearance of the display following cursor shifting.

When a user is satisfied with the image framing in the display 5 and with the positioning of the or each cursor, such as the rectangular cursor 23, the user takes a first image in a step 13 by actuating the shutter release control 7. The processor stores the image digitally and, in a step 14, automatically moves the position of the cursor on the viewfinder display 5. FIG. 4 repeats the displayed image 22 from FIG. 3 and illustrates the appearance of the viewfinder display 5 when the first image is captured. The cursor is shifted laterally as illustrated in FIG. 5 by an amount which may, for example, correspond to approximately the average interocular distance of a human, or alternatively to the parameters of the 3D display upon which the image will be shown. This amount determines in part the amount of depth which is viewable in the 3D image formed by the stereoscopic pair of images captured by the camera. A larger shift would allow more depth to be visible but at the loss of overlapping image area so that the area of the final image would be substantially reduced. Also, excessive amounts of depth make 3D images uncomfortable to view either at all or for long periods of time. Conversely, if the shift is too small, then very little depth would be visible in the 3D image so that the usefulness of the 3D image would be diminished.

The amount of shift may be determined using techniques disclosed, for example, in EP 1 089 573, the contents of which are incorporated herein by reference. By fixing the amount of shift, the amount of depth of an object in a 3D image is fixed irrespective of how close the object is. The autofocus function on the camera 1 may be used to set limits on the amount of depth which is viewable and information from the autofocus system may be used in determining the lateral shift of the cursor.

In the present example, it is assumed that the first captured image is of the view intended for the left eye in a stereoscopic pair. As illustrated in FIG. 5, the cursor is shifted by the calculated amount laterally to the left with respect to its position when the first image was captured. In order to assist in the following alignment step, the portion of the first image within the cursor 23 may be displayed within the shifted cursor. For example, this portion of the first image may be spatially highpass filtered so as to highlight details and make the image partially transparent to allow the current image on the sensor 3 to be visible and to permit alignment. FIG. 5 illustrates the part of the first image within the cursor 23 by broken lines at 27.

Figure 7:
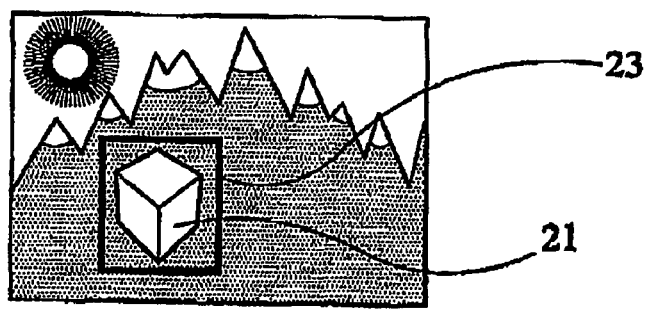
FIG. 7 illustrates the appearance of the viewfinder display when the camera is at the correct position for capturing the second image.
Figure 6:
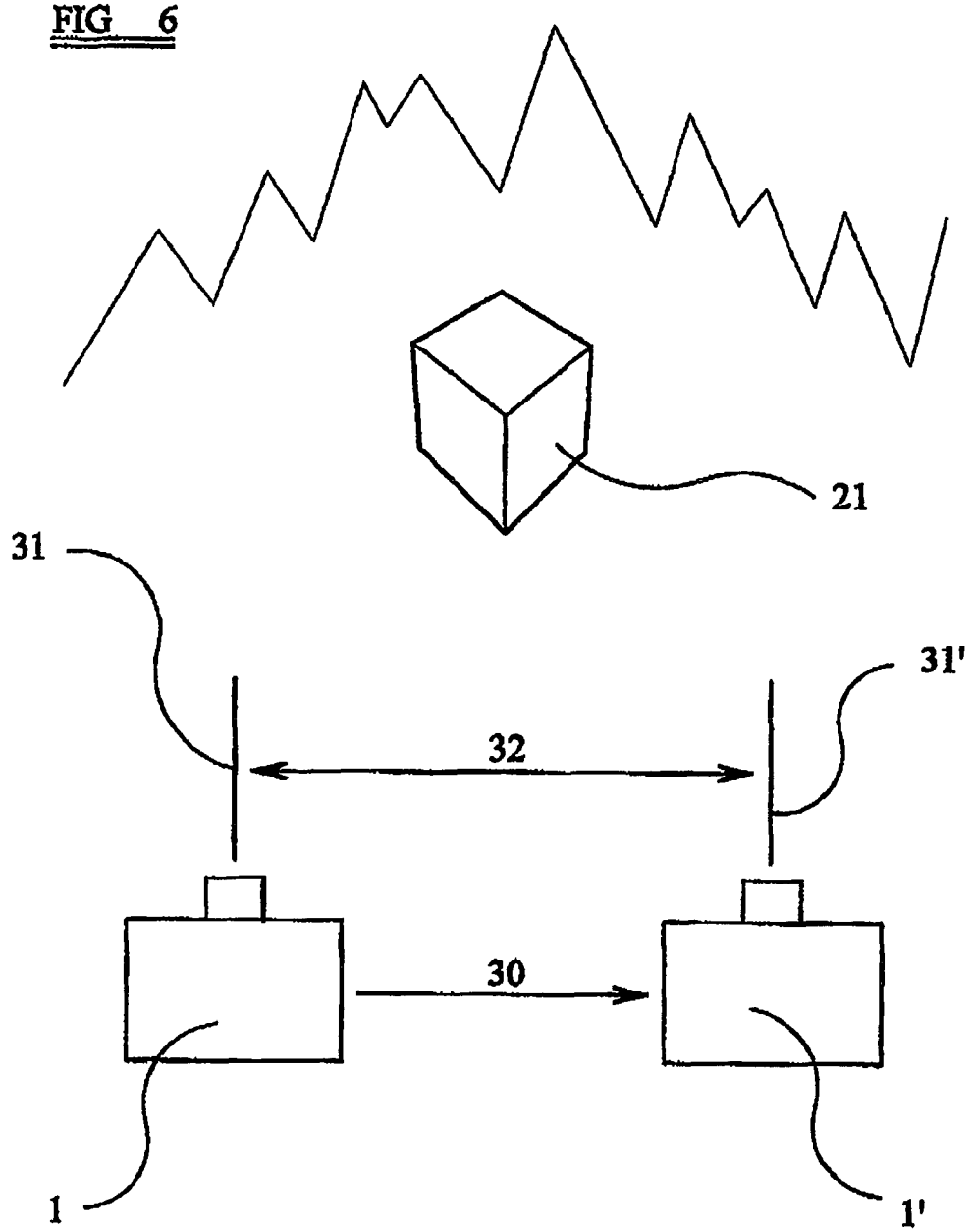
FIG. 6 illustrates diagrammatically the correct positions of a camera for capturing first and second images.

When the shifted cursor is displayed, the user then moves the camera so as to capture a second of the stereoscopic pair of images. For example, instructions to the user may be displayed on the viewfinder display 5 instructing the user to move the camera 1 to the right until the shifted cursor is correctly aligned on the image feature of the image currently being imaged by the optical system 2 on the sensor 3 and being displayed on the viewfinder display 5. FIG. 7 illustrates the appearance of the overlaid image on the viewfinder display 5 when the user has moved the camera by the correct amount and has oriented the camera in the correct direction. In this case, the cursor 23 is again aligned with the image feature 21 as now displayed and the "ghost" image 27 is accurately superimposed over the image feature 21. In order to achieve the appearance illustrated in FIG. 7, the camera 1 is translated horizontally to the right as illustrated by the arrow 30 in FIG. 6. Also, in order to achieve the combined image shown in FIG. 7, the camera at its new position 1' must have substantially the same orientation in three dimensions as at the first position from which the first image was captured. FIG. 6 illustrates the optical axes 31 and 31' of the camera at the two positions. The optical axis comprises the optical axis of the optical system 2 and, for optimum results, the axes 31 and 31' should be parallel so that the shift in position is a purely translational one with the amount of shift being indicated at 32. Thus, the camera points in parallel directions at the two positions and there is no rotation about the optical axis. This ensures that substantially rectilinear images are captured and require little or no further processing in order to provide a good 3D effect.

Although in this example the cursor is described as being displayed for one image then shifted laterally for the second, it is possible to display the cursor in both initial and shifted positions on both images. The user aligns the image feature with the unshifted cursor, takes the first image, and then aligns the feature with the shifted cursor. An indication of the "active" cursor may be provided by highlighting the cursor to be used with, for example, colour or solid/dashed lines.

The moving of the camera and aligning of the cursor are illustrated by a step 15 in FIG. 2. When the substantially correct movement has been achieved and is indicated by the viewer seeing the combined image illustrated in FIG. 7, the user actuates the shutter release control 7 so as to capture or "take" the second image as illustrated by a step 16 in FIG. 2. The capture of a stereoscopic pair of images then finishes at 17 with the processor storing the second image.

As an alternative or additional technique for capturing the second image, a semi-automatic "one shot" method may be used and is illustrated in FIG. 8. The steps 10 to 14 are performed as described hereinbefore so that, in accordance with this method, the user actuates the shutter release control 7 to capture the first image and the cursor is automatically moved to show on the viewfinder display 5 the composite image shown in FIG. 5. The user may then be instructed to move the camera as described hereinbefore. However, the processor 4 performs a routine which measures the correlation between part of the captured first image and the "candidate second image" currently imaged on the sensor 3 and displayed in the viewfinder display 5. For example, the correlation between the part of the first image which was inside the cursor 23 when the first image was captured and the part of the current image within the shifted cursor 23 is continuously calculated. This is illustrated by a step 40 in FIG. 8.

A step 41 determines whether the correlation is above a threshold, which is indicated as being the maximum correlation in this example. Motion estimation theory predicts the general behaviour of a correlation function around the position of a maximum (alternatively, using the phase correlation technique, the maximum is determined directly). As the user moves the camera towards the correctly shifted position, the correlation increases and the maximum can be found by monitoring the change in the value of the correlation. Two techniques which can determine when the maximum has been found to sufficient accuracy are: determining when the correlation starts to decrease; determining when the improvement in correlation falls below a predetermined threshold.

When maximum correlation is detected, a step 42 automatically captures the second image. Thus, the user moves the camera and the second image is automatically captured when the camera is at the position 1' where correlation is at its maximum.

The step 42 of capturing the second image may also be performed manually by the user, who may utilise a meter indicating the level of correlation to establish a judgement of when to capture the second image. The user takes both images manually, using an indication of correlation to determine an appropriate occasion to capture the second image.

In order for the semi-automatic method to be performed, the area around the cursor 23 must be sufficiently large to provide an accurate measure of correlation. Also, the area should be such as to overlap with its shifted position. If sufficient computing power is available within the processor 4, the area used for measuring correlation may comprise substantially the whole image.

The correlation may be based on luminance information in the images but may alternatively or additionally use other information such as feature points, texture and colour of the images. Any suitable metric may be used to measure correlation and examples of such measures are mean squared error, maximum absolute difference, cross-correlation, and phase correlation for example as disclosed by C. Kuglin and D. Hines in "The Phase Correlation Image Alignment Method", Proceedings of the IEEE International Conference on Cybernetics and Society, pp 163-165, 1975.

Some of these correlation metrics, such as phase correlation, are capable of indicating the distance to the desired position and this may be used to assist the user in moving the camera to the position from which the second image should be captured. For example, a visual and/or audio indication of the distance from the correct position may be provided by the camera 1. In the case of a visual indication, this may be provided on the viewfinder display 5, for example in the form of a graph or moving bar. In the case of an audio indication, this may be provided by a tone which changes pitch in accordance with distance from the correct position. Phase correlation may be implemented using fast Fourier transforms, which may be performed in real time using acceptable amounts of processing power and are known in the technical field.

Because the first and second images are captured at different times, any moving objects in the scene will be at different locations by the time the camera is moved to the second position and the second image is captured. This causes noise in the 3D effect and looks unnatural. For example, if a 3D image of a person is to be captured, the subject must remain still between capturing the first and second images and this may be difficult. It is therefore advantageous for the second image to be captured quickly after the first image has been captured. The semi-automatic method of second image capture using phase correlation allows the camera to be repositioned quickly so that the delay between capturing the first and second images may be made relatively small.

Although the second image is at a different viewpoint, the correlation will be at a maximum when the camera is purely translated as indicated by the arrow 30 in FIG. 6 from the position at which the first image was captured to the position at which the second image is captured. Any rotation of the camera will reduce the amount of correlation. More complex motion models may be applied to the evaluation of the correlation such that the orientation of the camera in all dimensions may be interactively corrected. If sufficient computational power is available, interactive rectification may be performed with feedback utilizing an initial user guidance stage as described hereinbefore to locate the camera at a suitable position.

INDUSTRIAL APPLICABILITY

It is thus possible to provide a technique which greatly assists users in capturing stereoscopic pairs of images and which requires little or no processing in order to give a comfortably viewed 3D effect when viewed on suitable display equipment. In particular, a user is assisted in shifting the camera by the correct amount and correctly orienting the camera so that rectilinear images are captured.

Although this technique has been described in detail for capturing images with a camera, it may be used for selection of stereoscopic pairs of images from other sources. For example, this technique does not have to be used in "real time" but may be used to select stereoscopic pairs from a video sequence, where a video camera has been translated, or from a sequence of still images which were previously captured. In such examples, a first image may be chosen by inspection or arbitrarily. Other images may then be selected, by inspection or arbitrarily, and the technique may be applied so as to select the "best" stereoscopic pair of images from those available.

The invention claimed is:

1. A method of selecting a stereoscopic pair of images, using a processor, comprising the steps of:
   (a) selecting and capturing a first image by means of a camera;
   (b) aligning at least one cursor overlaid on the first image with at least one image feature of the first image;
   (c) shifting automatically the or each cursor laterally by a predetermined amount; and
   (d) selecting and capturing a second image by means of the camera when the second image contains the or each feature and the or each cursor is overlaid on the second image and is substantially aligned with the or each feature,
   wherein the camera has an optical axis and is oriented such that the optical axis when the second image is captured is substantially parallel to the optical axis when the first image is captured.

2. A method as claimed in claim 1, wherein the predetermined amount corresponds substantially to an average interocular separation.

3. A method as claimed in claim 1, wherein the predetermined amount corresponds to at least one parameter of a display for displaying the first and second images.

4. A method as claimed in claim 1, wherein the predetermined amount is dependent on image feature depth in the first image.

5. A method as claimed in claim 1, wherein the predetermined amount corresponds to a maximum comfortable viewing depth.

6. A method as claimed in claim 1, wherein the step (b) comprises aligning the or each cursor manually.

7. A method as claimed in claim 1, wherein the steps (a) and (d) comprise selecting the first and second images from a set of precaptured images.

8. A method as claimed in claim 1, wherein the second image is captured manually.

9. A method as claimed in claim 1, wherein the positions of the camera from which the first and second images are captured are spaced from each other substantially laterally and substantially perpendicularly to the optical axis when the first image was captured.

10. A method as claimed in claim 1, wherein the or each cursor comprises at least one of a grid of orthogonal lines, a cross-hair, a plurality of dots, a symbol defining a region of non-zero area, and a portion of the first image.

11. A method as claimed in claim 10, wherein the at least one cursor comprises the symbol and is a substantially rectangular outline.

12. A method as claimed in claim 10, wherein the or each cursor is displayed alongside a laterally shifted cursor in both the first and second images.

13. A method as claimed in claim 10, wherein the step (d) comprises overlaying part of the first image on the second image, and the at least one cursor is the symbol and the part of the first image comprises the portion of the first image overlaid by the region.

14. A method as claimed in claim 10, wherein the step (d) comprises overlaying part of the first image on the second image, and the at least one cursor comprises the symbol and the correlation is performed between a part of the first image overlaid by the symbol and a part of the at least one candidate second image overlaid by the shifted symbol.

15. A method as claimed in claim 14, wherein the areas over which correlation is performed of the first image and the at least one candidate second image overlap each other.

16. A method as claimed in claim 1, wherein the step (d) comprises overlaying part of the first image on the second image.

17. A method as claimed in claim 16, wherein the part of the first image is modified before overlaying.

18. A method as claimed in claim 17, wherein the part of the first image is spatially high pass filtered before overlaying.

19. A method as claimed in claim 1, wherein the step (d) comprises performing a correlation between the first image and at least one candidate second image.

20. A method as claimed in claim 19, wherein the step (d) comprises the user selecting the second image based on an indication of the level of correlation.

21. A method as claimed in claim 19, wherein the step (d) comprises selecting the second image when the correlation exceeds a threshold.

22. A method as claimed in claim 21, wherein the step (d) comprises selecting the second image when the correlation is a maximum.

23. A method as claimed in claim 19, wherein the correlation is performed on at least one of luminance, feature points, texture and colour.

24. A method as claimed in claim 19, the correlation comprises at least one of cross-correlation, mean square error, maximum absolute difference and phase correlation.

25. A method as claimed in claim 24, wherein the step (a) comprises capturing the first image by means of a camera, the step (d) comprises capturing the second image by means of the camera when the or each cursor is substantially aligned with the or each feature, and the step (d) comprises providing an indication of distance to a position of the camera for capturing the second image.

26. An apparatus for performing a method as claimed in claim 1.

27. A computer program recorded on a non-transitory computer-readable medium for adapting an apparatus, which comprises a processor to perform a method as claimed in claim 1 upon executed by the processor.

28. A camera for selecting a stereoscopic pair of images, comprising:
   a display for displaying images;
   means for causing the display to display at least one cursor overlying a displayed image;
   means for aligning the at least one cursor with a respective image feature of the displayed image;
   means for selecting and capturing a displayed image as a first image; and
   means for shifting automatically the at least one cursor laterally by a predetermined amount in response to selection by the selecting means of the first image;
   means for selecting and capturing a displayed image as a second image when the displayed image contains the respective image feature and the shifted at least one cursor is overlaid on the second image and is substantially aligned with the respective image feature
   wherein the camera has an optical axis and is configured such that the optical axis when the second image is captured is substantially parallel to the optical axis when the first image is captured.

29. A camera as claimed in claim 28, wherein the display comprises a camera viewfinder display.

30. A camera as claimed in claim 28, wherein the selecting means comprises a manually operable control for controlling the camera to capture at least the first image.

31. A computer program recorded on a non-transitory computer-readable medium, which when executed by a processor included in a camera for selecting a stereoscopic pair of images, and which further includes:
- a display for displaying images;
- means for causing the display to display at least one cursor overlying a displayed image;
- means for aligning the at least one cursor with a respective image feature of the displayed image;
- means for selecting and capturing a displayed image as a first image;
- means for shifting automatically the at least one cursor laterally by a predetermined amount in response to selection by the selecting means of the first image; and
- means for selecting and capturing a displayed image as a second image when the displayed image contains the respective image feature and the shifted at least one cursor is overlaid on the second image and is substantially aligned with the respective image feature,
- wherein the camera has an optical axis and is configured such that the optical axis when the second image is captured is substantially parallel to the optical axis when the first image is captured,
- causes the camera to perform a method as claimed in claim 1.

* * * * *